United States Patent
Kreuzer

(10) Patent No.: US 6,921,103 B2
(45) Date of Patent: Jul. 26, 2005

(54) AIRBAG MODULE

(75) Inventor: Martin Kreuzer, Kleinwallstadt (DE)

(73) Assignee: TRW Automotive Safety Systems GmbH & Co., KG, Aschaffenburg (DE)

( * ) Notice: Subject to any disclaimer, the term of this patent is extended or adjusted under 35 U.S.C. 154(b) by 215 days.

(21) Appl. No.: 10/122,440

(22) Filed: Apr. 12, 2002

(65) Prior Publication Data

US 2002/0153708 A1 Oct. 24, 2002

(30) Foreign Application Priority Data

Apr. 18, 2001 (DE) .................................... 201 06 693 U

(51) Int. Cl.⁷ .............................................. B60R 21/16
(52) U.S. Cl. ................................. 280/728.2; 280/731
(58) Field of Search ............................. 280/728.2, 731; 200/61.56, 61.54, 61.55, 61.57

(56) References Cited

U.S. PATENT DOCUMENTS

| | | | |
|---|---|---|---|
| 5,261,692 A | | 11/1993 | Kneip et al. ............ 280/728.2 |
| 5,280,946 A | * | 1/1994 | Adams et al. ........... 280/728.2 |
| 5,312,129 A | * | 5/1994 | Ogawa ................... 280/728.2 |
| 5,354,093 A | * | 10/1994 | Schenck et al. ......... 280/728.3 |
| 5,356,173 A | * | 10/1994 | Hongou et al. .......... 280/728.2 |
| 5,388,858 A | * | 2/1995 | Cuevas ................... 280/728.2 |
| 5,435,597 A | * | 7/1995 | Warner ................... 280/728.3 |
| 5,508,482 A | * | 4/1996 | Martin et al. ............ 200/61.55 |
| 5,685,557 A | * | 11/1997 | Persson et al. .......... 280/728.2 |
| 5,704,635 A | * | 1/1998 | Tajiri et al. .............. 280/728.2 |
| 5,738,369 A | * | 4/1998 | Durrani .................. 280/731 |
| 5,762,364 A | * | 6/1998 | Cuevas ................... 280/731 |
| 5,873,596 A | * | 2/1999 | Kantoh et al. ........... 280/728.2 |
| 5,950,494 A | * | 9/1999 | Sugiyama ................ 74/484 H |
| 6,050,597 A | * | 4/2000 | Coleman ................. 280/731 |
| 6,053,528 A | * | 4/2000 | Marx et al. ............. 280/728.3 |
| 6,079,737 A | * | 6/2000 | Isomura et al. .......... 280/731 |
| 6,371,508 B1 | | 4/2002 | Baur et al. .............. 280/728.2 |
| 6,419,261 B1 | * | 7/2002 | Ibe .......................... 280/728.2 |
| 6,422,594 B2 | * | 7/2002 | Hasebe .................... 280/731 |
| 2002/0113419 A1 | * | 8/2002 | Kal et al. ................. 280/731 |

FOREIGN PATENT DOCUMENTS

| | | |
|---|---|---|
| DE | 4134673 | 4/1993 |
| DE | 19614276 | 8/1997 |
| DE | 19837899 | 2/2000 |
| DE | 19516255 | 9/2000 |
| GB | 2290267 | 12/1995 |
| GB | 2339408 | 1/2000 |

OTHER PUBLICATIONS

Research Disclosure Publication No. 440 61 entitled "Airbag Assembly Cover Attachment", 12/200.

Research Disclosure Publication No. 403 60 entitled "Airbag Cover and Baseplate Attachment", Nov. 1997.

* cited by examiner

Primary Examiner—Paul N. Dickson
Assistant Examiner—Laura B. Rosenberg
(74) Attorney, Agent, or Firm—Tarolli, Sundheim, Covell & Tumino L.L.P.

(57) ABSTRACT

The invention relates to an airbag module, comprising a pot-shaped module housing that has a front wall that can be opened and a circumferential wall projecting from a rear side. The airbag module further comprises a baseplate that is attached to the circumferential wall by at least one snap-action hook that is able to latch into an opening. An unlatching protection is provided that reduces a cross-section of the opening after a latching procedure in such a way that unlatching is prevented.

1 Claim, 2 Drawing Sheets

AIRBAG MODULE

TECHNICAL FIELD

The invention relates to an airbag module.

BACKGROUND OF THE INVENTION

Known airbag modules comprise a pot-shaped module housing that has an open front wall and a circumferential wall projecting from a rear side, as well as a baseplate that is attached to the circumferential wall by at least one snap-action hook that is able to latch into an opening.

Up until now, the module housings have been attached to the baseplates by means of screwing or riveting. So-called latching connections with snap-action hooks that latch into openings are also known.

BRIEF SUMMARY OF THE INVENTION

The invention provides an airbag module with which unintentional partial detaching of individual latching hooks is ruled out in a simple manner, even when the module housing is being opened. This is achieved with an airbag module comprising a pot-shaped module housing that has a front wall that can be opened and a circumferential wall projecting from a rear side. The airbag module further comprises a baseplate that is attached to the circumferential wall by at least one snap-action hook that is able to latch into an opening. An unlatching protection is provided that reduces a cross-section of the opening after a latching procedure in such a way that unlatching is prevented. With the airbag module according to the invention, it is actually not the latching hook—which has a springy design and is therefore difficult to grasp—that is deformed, but rather the cross-section of the opening, from which the thickened end of the latching hook would have to exit, is reduced to such an extent that the thickened end can no longer slip out of the opening.

According to one embodiment, the unlatching protection is formed by a section of the rim of the opening that is plastically deformed in the direction towards the snap-action hook. In other words, after the latching hook has latched, a finishing step still has to be performed. Particularly with baseplates made of aluminum or magnesium die cast metal, which are preferably used for the module according to the invention, a plastic deformation of the rim of the opening is hardly possible, in contrast to a baseplate made of sheet metal. In order to make this possible, a plastically deformed bead is provided on the rim of the opening in order to form the unlatching protection. This bead, which is also present before the latching hook is inserted, is plastically deformed after the latching action, for example, by caulking. The bead provides sufficient material of the soft aluminum or magnesium so that, during caulking, there is no risk of tearing or enlarging the opening.

Another embodiment of the invention makes provision that a component is provided on the module near the baseplate, the component having a projection that functions as the unlatching protection. This projection protrudes into the opening and reduces its cross-section. Of course, after the latching, the component has to be positioned with respect to the housing, so that it can penetrate into the opening.

In this context, the invention relates in particular to a module for a vehicle steering wheel, the component being a horn plate that is provided with a horn contact and is affixed to the module. Together with the module for actuating the horn, this horn plate is mounted axially movably with respect to the rest of the steering wheel.

Preferably, the baseplate is a generator carrier, that is to say, a part onto which the gas generator of the module is locked.

DETAILED DESCRIPTION OF THE PREFERRED EMBODIMENTS

Figure 1:
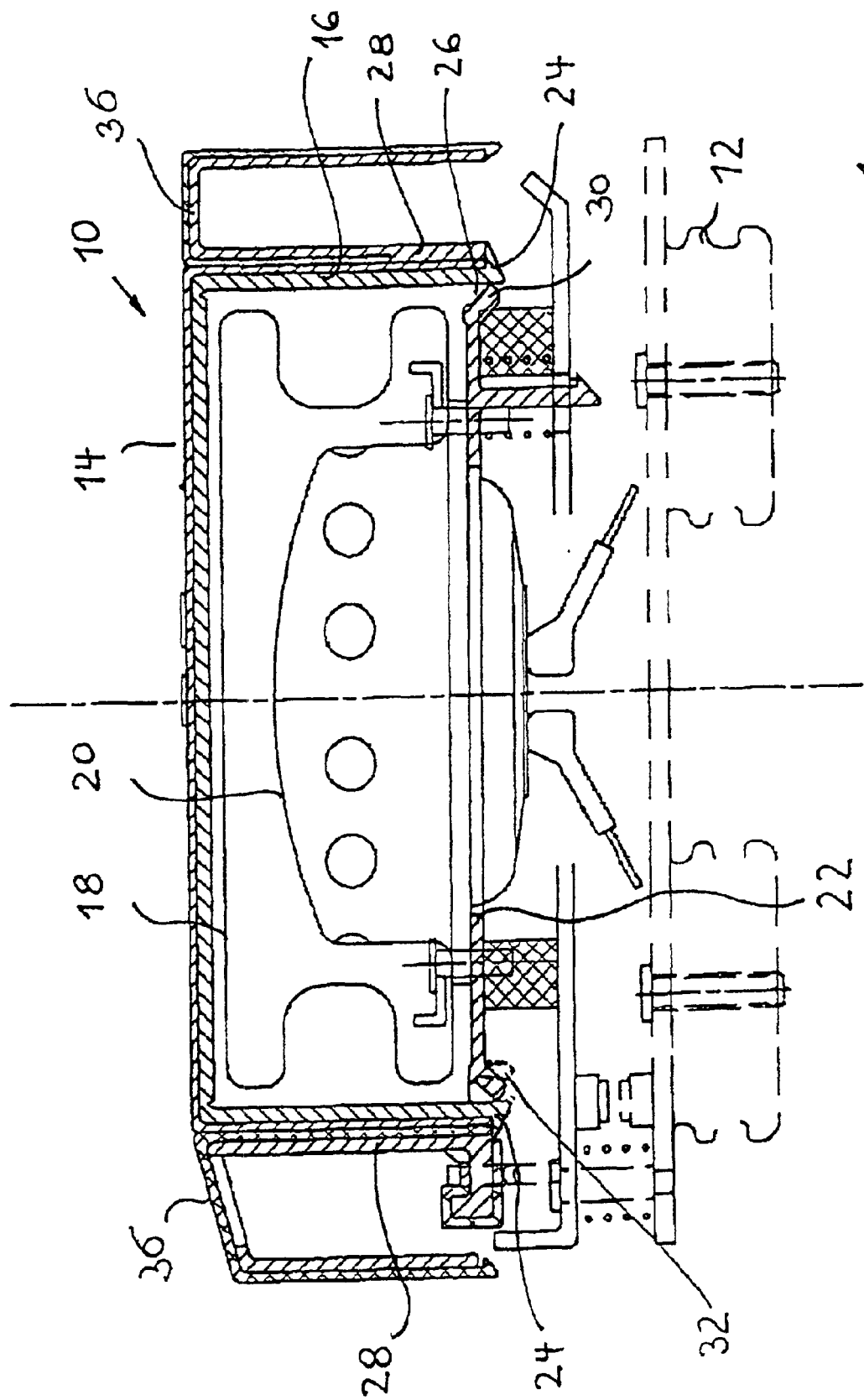
FIG. 1 is a cross-sectional view of an embodiment of the airbag module according to the invention and, FIG. 2 is a cross-sectional view of a second embodiment of the airbag module according to the invention.

FIG. 1 shows a vehicle steering wheel airbag module 10 that is attached to a steering wheel hub 12 shown in a stylized depiction. The airbag module 10 has a pot-shaped module housing consisting of a front wall 14 that can be opened and of a circumferential wall 16 projecting from the rear of the front wall 14. The module housing accommodates an airbag 18 and a gas generator 20. A baseplate 22 made of aluminum or magnesium die cast metal serves as the generator carrier since the gas generator 20 is screwed into the baseplate 22.

The baseplate 22 is connected to the circumferential wall 16 by several latching connections that are uniformly distributed across the circumference and closes the rear of the module housing. The latching connections consist of snap-action hooks 24 on the lower rim of the circumferential wall 16 that protrude through openings 26 in the baseplate and that grasp behind the rim of the openings 26. In addition to its portion situated radially inwards from the circumferential wall 16, the baseplate 22 also has a portion 28 that is situated radially outwards from the openings 26 and that extends upwards parallel to the circumferential wall 16; the section 28 surrounds the circumferential wall 16 and is connected in one piece to a front rim 36 that forms a lateral continuation of the front wall 14.

In order to prevent the snap-action hooks 24 from being bent radially inwards when the front wall 14 is opened by the unfolding airbag 18 and from becoming unlatched, an unlatching protection is provided on each snap-action hook 24.

The unlatching protection is formed by a section of the rim 30 of the openings 26 that is provided with a bead 32 projecting towards the bottom.

When the module housing is placed onto the baseplate 22, the bead 32, as shown on the left-hand half of FIG. 1 with a broken line, projects axially towards the bottom. The openings 26 are thus large enough to allow the snap-action hooks 24 to pass through. Subsequently, at each opening 26, the bead-like rim 30 is plastically deformed radially towards the outside, for example, by caulking, so that the cross-section of each opening 26 is sufficiently reduced to rule out an unlatching of the snap-action hooks 24.

Figure 2:
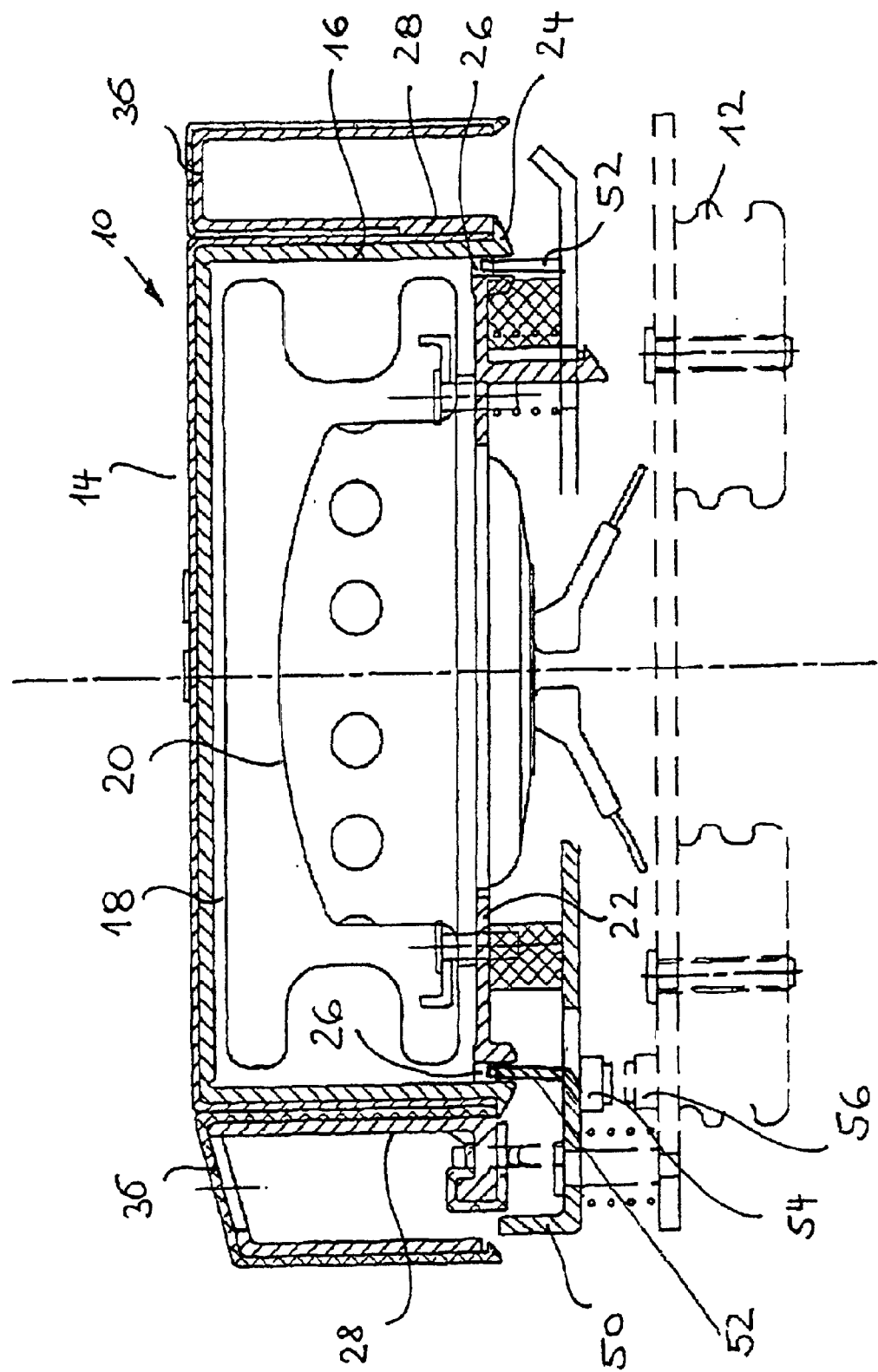

The embodiment according to FIG. 2 corresponds essentially to that shown in FIG. 1, so that reference numerals already introduced will be retained for parts having the same function.

Unlike the embodiment according to FIG. 1, the unlatching protection in the embodiment according to FIG. 2 is not created by deformation of the rim of the openings 26. In this embodiment, a part situated near the baseplate 22 is provided in the form of a horn plate 50 in the area below each opening 26 with a projection 52 that protrudes into the opening 26 and that reduces the cross-section of the associated opening 26 in such a way that it serves as an unlatching protection and rules out the unlatching of the associated snap-action hook 24.

For the rest, the horn plate 50 is affixed to the module, i.e. it is movable together with the module. A horn contact 54 provided on the bottom of the horn plate 50 makes contact with a second horn contact 56 when the module is pushed downwards in the axial direction in order to close an electrical circuit for actuating the horn.

What is claimed is:

1. An airbag module comprising:
   a pot-shaped module housing that has a front wall that can be opened and a circumferential wall projecting from a rear side,
   a baseplate that is attached to said circumferential wall by at least one snap-action hook that is able to latch into an opening, and
   an unlatching protection being provided that reduces a cross-section of said opening after a latching procedure in such a way that unlatching is prevented,
   a component being provided on said gas bag module near said baseplate, said component having a projection that functions as said unlatching protection and that protrudes into said opening and reduces the cross-section of the opening,
   said module is a steering wheel nodule and said component is a horn plate provided with a horn contact and affixed to said module.

* * * * *